United States Patent [19]

Kowalski

[11] 4,239,138
[45] Dec. 16, 1980

[54] ARTICLE CARRIER COMPRISING SLOTTED SIDE RAIL WITH SLIDABLE CROSS-RAIL AND BRACKET THEREFOR

[75] Inventor: Daniel J. Kowalski, Ortonville, Mich.

[73] Assignee: Four Star Corporation, Troy, Mich.

[21] Appl. No.: 46,995

[22] Filed: Jun. 11, 1979

[51] Int. Cl.³ .............................................. B60R 7/00
[52] U.S. Cl. ..................................... 224/321; 224/325
[58] Field of Search ............... 224/325, 326, 309, 321, 224/331; 248/214, 222.1, 222.3, 225.1, 225.4, 245, 295, 298

[56] References Cited

U.S. PATENT DOCUMENTS

| 4,132,335 | 1/1979 | Ingram | 224/324 |
| 4,133,465 | 1/1979 | Bott | 224/326 X |
| 4,162,755 | 7/1979 | Bott | 224/326 |

Primary Examiner—Steven M. Pollard
Attorney, Agent, or Firm—Reising, Ethington, Barnard, Perry & Brooks

[57] ABSTRACT

A slotted side rail and cross-rail receiving bracket for association with an article carrier, such as a luggage carrier, is disclosed. A slidable cross-rail is supported between a pair of cross-rail receiving brackets and is movable with the brackets. Each bracket includes a disc for locking the bracket anywhere along the length of an associated side rail. The disc prevents unintended loosening of the bracket and resultant movement of the bracket along the side rail.

2 Claims, 4 Drawing Figures

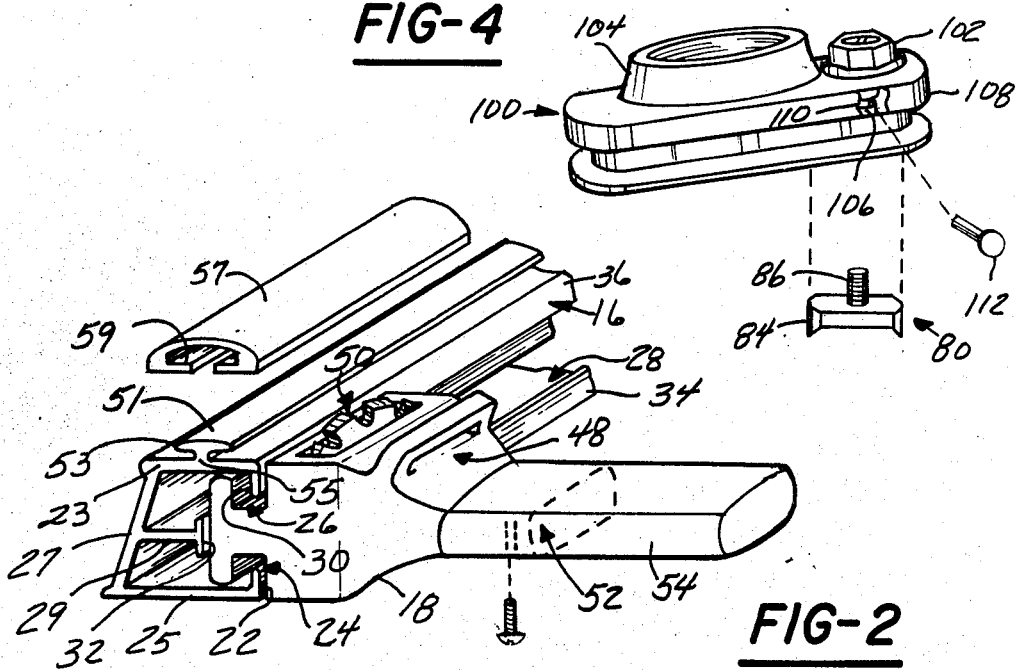
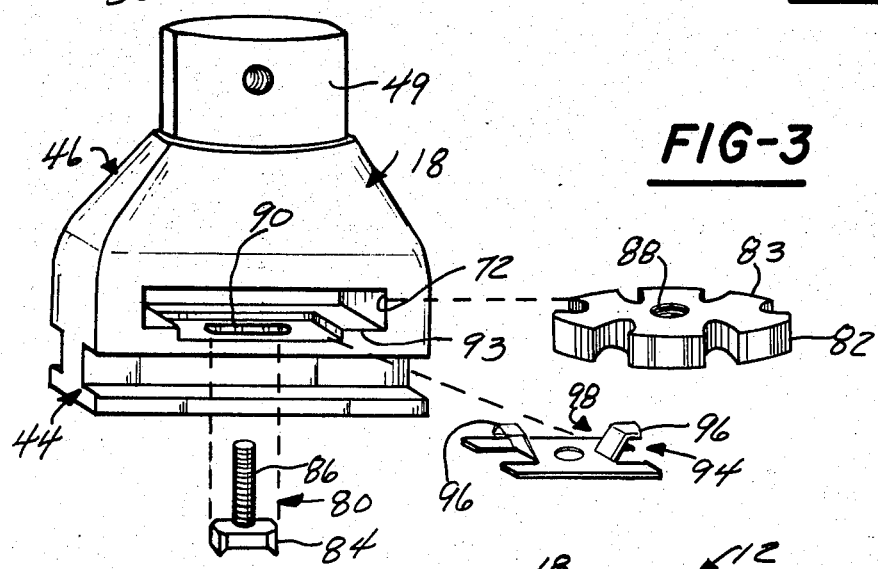
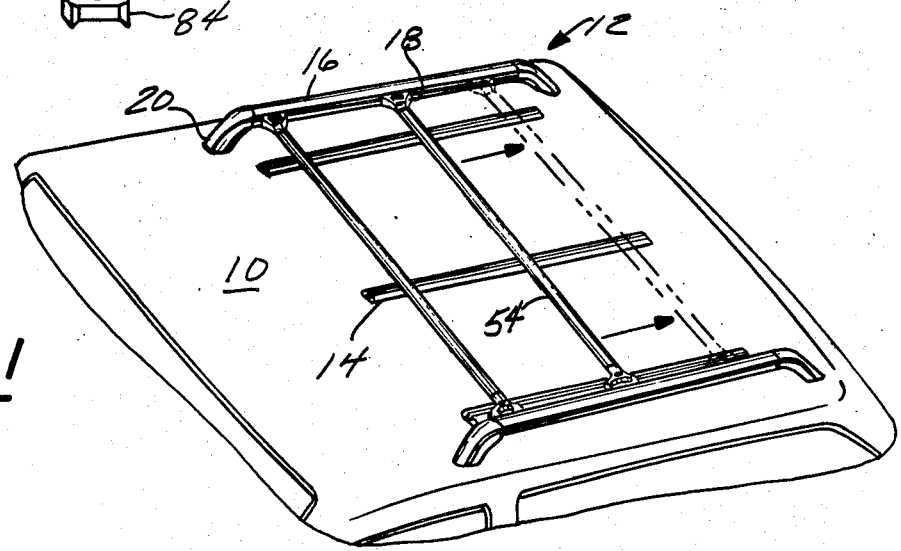

ARTICLE CARRIER COMPRISING SLOTTED SIDE RAIL WITH SLIDABLE CROSS-RAIL AND BRACKET THEREFOR

BACKGROUND OF THE INVENTION

I. Field of the Invention

The present invention pertains to a slotted side rail configuration which receives an adjustable bracket. More particularly, the present invention pertains to a slotted side rail and an adjustably positionable bracket associated therewith for vehicle-related article carriers. Even more particularly, the present invention concerns a side rail configured to receive an adjustably positionable bracket for vehicle-associated luggage racks.

II. Prior Art

U.S. Pat. No. 3,330,454 discloses a luggage rack employing a movable cross-rail releasably interconnected at its ends to a pair of spaced apart longitudinal rails. The cross-rail ends are releasably interconnected to the longitudinal rail by means of a slide block slidingly retained in a recess within the longitudinal rail. A threaded fastener passes through an aperture in a cross-rail support and threadingly engages an aperture formed in the slide block. Tightening the fastener forces the cross-rail support against a wall of the longitudinal rail to retain the support in a fixed position. U.S. Pat. No. 3,519,180 discloses a cross-rail movable along a side rail and releasably attached thereto. A recess spaced in from an end of the cross-rail is formed to be slidingly received by a longitudinal opening formed along an inside wall of the side rail. The cross-rail is threaded inward from the recess to threadingly engage a rotatable collar. Tightening of the collar forces the collar against the inside wall of the side rail to retain the cross-rail.

Both of the above listed United States Patents disclose a means for releasably locking the cross-rail to the side rail by pinching or squeezing a wall of the side rail. The present invention, as will be disclosed more fully hereinbelow, urges a key into abutment with a wall of a track formed in the side rail to lock the cross-rail in position. The present invention employs the bracket of U.S. Pat. No. 4,132,335, as well as those disclosed in copending U.S. patent application Ser. No. 015,327, filed Feb. 26, 1979, the disclosure of which is hereby incorporated by reference.

SUMMARY OF THE INVENTION

In accordance with the present invention, there is provided a slotted side rail configured to receive an adjustably positionable bracket for an article carrier, wherein the bracket is locked or prevented against unintended movement. The slotted side rail hereof gnerally comprises:
(a) an elongated member including an inside wall and an upper wall;
(b) a slot formed along the inside wall of the rail and configured to slidingly receive an adjustably, positionable bracket; and
(c) an interior wall for locking engagement with the bracket.

The side rail may, also, include:
(a) a rub strip receiving projection along the upper wall of the rail;
(b) a rub strip engageable with the rub strip engaging projection; and
(c) a stanchion engaging recess formed at the ends of the side rail.

The bracket hereof generally comprises:
(a) means for variably and adjustably positioning the bracket along the slot provided in the side rail;
(b) an inner section interconnected to the positioning means;
(c) a locking means for locking the bracket in position; and
(d) means for receiving a cross-rail.

The stanchion hereof generally comprises:
(a) a bottom wall mounted to and conforming to the vehicle surface;
(b) a vertical structure having one open side and a front and rear wall curving gently toward the rail, tapering to a narrowed top; and
(c) a rail engaging projection extending from the top portion of the stanchion to slidingly engage and support an end portion of the side rail.

An opposed pair of stanchions support the rail longitudinally along a surface of the vehcile.

The inner section of the bracket may, optionally, include an opening through which is laced a tie-down strap or the like.

As contemplated by the practice of the present invention, the bracket hereof comprises a slide plate or base adapted to be slidingly disposed in a slot formed in the side rail.

The bracket locking means hereof, preferably, includes a key or wedge which is threadably secured to a rotatable disc and which extends through the positioning means. As the disc is rotated in a first direction, the key is urged into engagement with the interior wall of the side rail to lock the bracket in position. Rotation of the disc in a counter or second direction disengages the key from the wall to permit movement of the bracket.

For a more complete understanding of the present invention reference is made to the following detailed description and accompanying drawing. In the drawing like reference characters refer to like parts throughout the several views, in which:

BRIEF DESCRIPTION OF THE DRAWING

FIG. 1 is a broken perspective view of a vehicular-associated article carrier incorporating a preferred embodiment of a slotted side rail and bracket in accordance with the present invention;

FIG. 2 is a broken perspective view of the bracket and side rail of the present invention;

FIG. 3 is a perspective, exploded view of the bracket hereof; and

FIG. 4 is a partially exploded perspective view of a second embodiment of the bracket with the disc offset from the cross-rail.

DESCRIPTION OF THE PREFERRED EMBODIMENT

Referring to the drawing and, in particular, FIGS. 1-3, there is depicted therein a preferred embodiment of the present invention. In accordance herewith, there is provided a vehicle body section 10 having an article carrier 12 disposed and affixed thereon. The article carrier depicted in the drawing may comprise a plurality of optional slats 14. The slats 14 are, generally, longitudinally extending members which are affixed to the vehicle body by any suitable mode, such as threaded fasteners (not shown) or the like.

As defined by the present invention, the article carrier 12 comprises at least one side rail 16 adapted to receive a cross-rail receiving bracket 18 in accordance with the present invention. An inner surface 22 of the side rail 16 is provided with bracket receiving means 24. The bracket receiving means 24 comprises a channel 26. The channel or track 26, in a preferred embodiment, includes a longitudinal slot 28 formed substantially along the extent of the inner surface of the side rail. The slot 28 is in registry with and opens up into an enlarged guide path 30. The guide path is coextensive with the slot 28. The guide path 30 includes an interior wall 32 which defines a seat for the bracket 18 in a manner to be described subsequently. The junction between the slot 28 and the guide path 30 is defined by a pair of opposed, inwardly directed shoulders 34,36 respectively. The shoulder 36 is integral with a top wall 23, and the shoulder 34 is integral with a bottom wall 25. The top and bottom walls are integral with an outer wall 27 which encloses the side rail to form an integral structure. A flange 29 projects horizontally inward from the outer wall 27 and supports the interior wall 32 along the inside end thereof. As will subsequently be described, the wall 32 and the shoulders 34,36 cooperate to retain the bracket 18 in a fixed position when the bracket is placed in a locked position. A rub strip receiving projection 51 comprises a horizontal flange 53 joined to the rail upper wall by a narrow neck 55. A rub strip 57, which, comprises an arcuate upper surface and a recess 59 complementary an the rub rail receiving projection 51, is adapted to envelope the projection 51 to hold the rub strip in place.

The side rail 16 further comprises means for limiting the longitudinal movement of the bracket 16 in the track 26. For example, the limiting or stop means can comprise a stanchion 20 journalled onto one end of the side rail 16. It should be noted that the side rail 16 can comprise a formed sheet metal member, a solid or hollow interior extrusion or the like, as desired. The criticality to be attached to the side rail is that it be provided with the longitudinally extending channel 26.

Where used, each stanchion 20, generally, comprises a bottom wall conforming to and mounted to the vehicle surface. A front and rear wall extend upward from the bottom wall, curving gently toward the rail and tapering toward the upper portion thereof. A projection at the top of the bracket is journalled into an opening or recess formed at each end of the rail. The recess defines a support for an associated stanchion.

As heretofore noted, the side rail 16 receives the bracket 18. The bracket 18 generally, comprises:
(a) a base section 44 for adjustably positioning the bracket along the extent of the track 26;
(b) an inner section 46 integral with the base; and
(c) means for selectively locking the bracket in position.

The bracket hereof, also, comprises means 52 for detachably mounting an article carrier cross-rail 54 thereto. The inner sections may also comprise means 48 for receiving an article carrier tie-down strap or the like.

With more particularity, the base section 44 is slidably movable in the track 26. Thus, the base section is configured to fit and slide in the track 26. Preferably, the base section includes an inner body 56 analogously configured to, but being dimensionally slightly less than that of the guide path 30. This dimensioning enables the inner body 56 to be slid, with facility, along the length of the guide path. The body 56 can have other configurations as long as it can slide within the track.

A shank 58 projects inwardly from the inner body 56 and is integrally formed therewith. The shank 58 is disposed substantially perpendicular to the inner body and centrally thereof. The shank 58 is coextensive with the inner section along the longitudinal extent thereof. The shank 58 has a width slightly less than that of the slot 28 and projects therebeyond, as shown.

It is to be appreciated that the base defines means for variably adjustably positioning the bracket, per se, along the extent of the track.

The inner section 46 is integrally formed with the base section 44 and is united therewith at the junction of the shank 58 with the lower end of the inner section 46. The inner section is substantially equal in length to the base. As shown in the drawing, the inner section has an irregular configuration any may include the means 48 for receiving an article carrier tie-down device. A projection 49 extending inward from the bracket provides the means for mounting a cross rail 54.

Referring again to the drawing, as heretofore noted, in order to set the bracket in any position along the length of the associated side rail, the present invention further comprises means 50 for releasably locking the bracket 18 in position. The locking means 50 generally comprises a locking key 80 and a rotatable disc 82 threadably interconnected to the key.

The key 80 is defined by a solid body 84 and a threaded shaft 86. The shaft 86 has a threaded profile formed about the periphery thereof. The shaft 86 is integrally formed with the solid body 84 and projects outwardly therefrom.

The disc 82 has a central bore 88 passing through the center of the disc. The disc 82 is configured to be slidingly received by a frontal opening 72 in the bracket 18 with portions of the periphery of the disc 82 projecting radially outward from the frontal opening 72. The internal periphery of the disc about the central bore 88 is provided with a threaded profile. The threaded profile of the shaft is complementary to that of the periphery of the bore 88. Furthermore, the diameter of the bore 88 is substantially equal to that of the shaft. Thus, the shaft and the bore 88 cooperate to define means for threadably interconnecting the disc 82 and the key 80.

As shown in FIG. 3, the lower body 44 has an inwardly directed recess forming a keyway 90 therein. The keyway has a height substantially equal to that of the body 84 to enable the body to nest therewithin. The keyway 90 projects inward communicating with the frontal opening 72, thus providing a space through which the shaft 86 projects. This type of bracket is more particularly described in U.S. Pat. No. 4,132,335.

Optionally the disc 82 is ratcheted against rotation by means of a spring 94 including a pair of legs 96, 97 biased into a plurality of openings 83 formed radially in the disc 82. As shown in FIG. 3 a recess 93 formed in the frontal opening nestingly receives the spring 94. Above identified copending U.S. Patent application Ser. No. 015,327 filed Feb. 26, 1979, discloses and more completely describes the ratcheted disc, and is hereby incorporated by reference.

The locking mechanism functions by implacing the bracket in the slot and sliding same to the desired position. Thereafter the disc is rotated in a first direction. Rotation of the disc urges the key outward into engagement with a wall 32 of the track guide path 30. This action wedges and locks the lower body between the bottom wall 32 and the opposed shoulders 34, 36. Rotation of the disc in the opposite direction against the detent withdraws the key into the keyway, thereby releasing the key from engagement with the bottom wall 32. Thus, the bracket is free to be slid in the track. When the shaft 86 and the disc 82 have been assembled and implaced in the track, the disc and shaft are trapped in the bracket and cannot be disassembled.

Referring again to the drawing, and in particular to FIG. 4 wherein there is illustrated at 100 another embodiment of the bracket of the present invention. As illustrated in FIG. 4 a rotatable disc 102 is offset from a cross-rail receiving projection 104 which lowers the profile of the bracket. A shaft 106 projecting outward from the disc is rotatably supported by a bore 108 interiorly of the bracket. A groove 110 formed in the shaft and a rivet 112, aligned to engage the groove, cooperate to rotatably retain the rotatable disc 102. A threaded bore (not shown) formed in the shaft threadingly engages the threaded shaft 86 of the key 80. Rotation of the disc 102 in a first direction urges the key 80 into engagement with a wall of the side rail to retain the bracket in position, and rotation of the disc 102 in a counter direction releases the bracket for movement along the side rail.

It should also be noted that other wedging arrays can be used with equal efficacy. For example, the base 44 can be urged into engagement with the shoulders via a screwjack effect between the disc and the base to thereby close up the bracket about the shoulders 34,36. This variation is within the scope hereof.

It is to be appreciated that there has been described herein a slotted side rail with a bracket supported slidable cross-rail for an article carrier that can be readily locked in any desired position in a slot formed in the side rail. No unauthorized movement of the bracket is permitted without the hand rotation of a disc mounted in the bracket for locking and unlocking the bracket.

Having thus described my invention, what I claim is:

1. A movable cross-rail assembly for an automotive-mounted article carrier comprising:
   a side rail attached to the vehicle;
   a bracket-receiving slot formed along an inner surface of the side rail;
   a movable cross-rail receiving bracket engaging the slot for movement therealong, said bracket including
   a base section engageable with the slot,
   an inner section interconnected to the base section;
   means for receiving a cross-rail formed on the bracket; and
   means for releasably locking the bracket along the slot, said locking means including
   a disc rotatably mounted to the bracket, said disc having a plurality of radial slits projecting inward a distance from a periphery thereof,
   a spring detent being normally biased into at least one of said slits to provide a ratchet to releasably retain said disc against rotation.

2. A movable cross-rail assembly as set forth in claim 1 wherein the bracket-receiving slot is disposed in a generally vertical plane, said side rail including
   an outer wall spaced from said inner surface,
   a flange supported from said outer wall and terminating in a generally vertical wall section parallel to and inwardly spaced from said bracket-receiving slot, the base portion of said bracket being disposed between said slot and said vertical wall section.

* * * * *